UNITED STATES PATENT OFFICE.

AUGUST LEOPOLD LASKA, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

DISAZO DYESTUFF.

982,508.  Specification of Letters Patent.  Patented Jan. 24, 1911.

No Drawing.  Application filed July 15, 1910.  Serial No. 572,098.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with the post-office address Gerberstrasse No. 5, have invented new and useful Improvements in Disazo Dyestuffs, of which the following is a specification.

My invention relates to the manufacture and production of new diazo dyestuffs, which can be obtained by combining the tetrazo compound of the toluylenediamin sulfonic acid $$CH_3:NH_2:SO_3H:NH_2 = 1:2:4:6$$

with one molecule of 2.8-amino-naphthol-6-sulfonic acid in acid solution and one molecule of a metadiamin or meta-aminophenol. These dyestuffs dye cotton reddish shades, which after combination with diazotized para-nitranilin on the fiber change into reddish-brown shades fast to washing and leaving after being discharged a pure white.

In order to illustrate the new process more fully the following example is given the parts being by weight: 22.4 parts of the sodium salt of toluylenediamin sulfonic acid dissolved in 300 parts of water are cooled with ice and diazotized with 14 parts of sodium nitrite and 65 parts of hydrochloric acid (20° Bé.). An ice cold aqueous solution of 23.9 parts of 2.8-amino-naphthol-6-sulfonic acid neutralized with sodium carbonate is added. When the intermediate product is formed a solution of 11 parts meta-phenylenediamin is added and the mixture is stirred for twelve hours. Then the solution is rendered neutral by sodium carbonate, heated up to 70° C., and the coloring matter precipitated by addition of common salt. The dyestuff forms a dark-brown powder and dissolves in concentrated sulfuric acid with reddish Bordeaux color, in water with brownish-orange color. The aqueous solution is not altered by addition of caustic soda lye, by addition of hydrochloric acid the dyestuff is precipitated in form of reddish-brown flakes. It dyes cotton red shades which after combination with diazotized paranitranilin on the fiber change into reddish-brown shades fast to washing and leaving after being discharged a pure white. In analogous manner the formation of dyestuff may be performed by using other meta-diamins, for instance meta-toluylenediamin. The dyestuff with meta-aminophenol in second place gives reddish-yellow-brown shades after combination with diazotized para-nitranilin on the fiber.

Now what I claim and desire to secure by Letters Patent is the following:

1. The process for the production of new disazo dyestuffs consisting in combining the tetrazo compound of the toluylenediamin sulfonic acid $$CH_3:NH_2:SO_3H:NH_2 = 1:2:4:6$$

with one molecular proportion of 2.8-amino-naphthol-6-sulfonic acid in acid solution and with one molecular proportion of a metadiamin.

2. As new articles the dyestuffs obtained by combining the tetrazo compound of the toluylenediamin sulfonic acid $$CH_3:NH_2:SO_3H:NH_2 = 1:2:4:6$$

with one molecular proportion of 2.8-amino-naphthol-6-sulfonic acid in acid solution and with one molecular proportion of a metadiamin which dyestuffs form a dark-brown powder dissolving in concentrated sulfuric acid with bordeaux, in water with brownish to reddish-orange color, the aqueous solution of which is not changed by addition of caustic soda lye, the dyestuff being precipitated in form of reddish-brown flakes by addition of hydrochloric acid.

3. The process for the production of new disazo dyestuff consisting in combining the tetrazo compound of toluylenediamin sulfonic acid $$CH_3:NH_2:SO_3H:NH_2 = 1:2:4:6$$

with one molecular proportion of 2.8-amino-naphthol-6-sulfonic acid in acid solution and with one molecular proportion of meta-phenylenediamin.

4. As new article the dyestuff obtained by combining of the tetrazo compound of toluylenediamin sulfonic acid $$CH_3:NH_2:SO_3H:NH_2 = 1:2:4:6$$

with one molecular proportion of 2.8-amino-naphthol-6-sulfonic acid in acid solution and with one molecular proportion of metal-phenylenediamin, which dyestuff forms a dark-brown powder dissolving in concentrated sulfuric acid with reddish bordeaux, in water with brownish-orange color, the aqueous solution of which is not changed by addition of caustic soda lye, the dyestuff being precipitated in form of reddish-brown flakes by addition of hydrochloric acid and dyeing cotton red shades which after combination with diazotized para-nitranilin on the fiber changes into reddish-brown shades fast to washing and leaving after being discharged a pure white.

In testimony, that I claim the foregoing as my invention, I have signed my name in presence of two witnesses, this fifth day of July 1910.

AUGUST LEOPOLD LASKA.

Witnesses:
EVA SATTLER,
HERMANN WEIS.